UNITED STATES PATENT OFFICE.

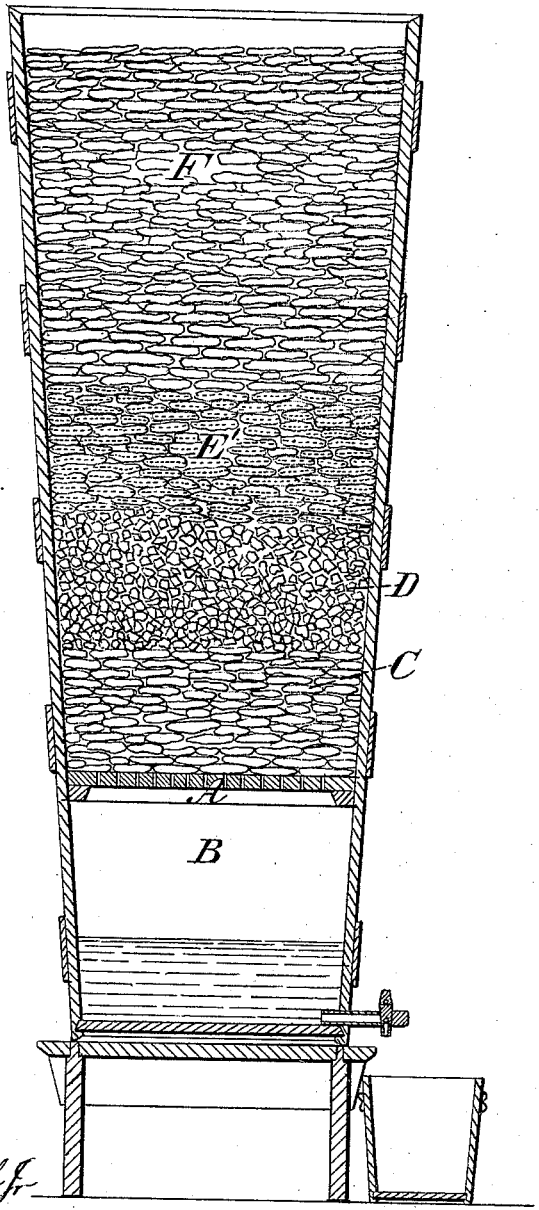

FREDERICK MICHAEL, OF DES MOINES, IOWA.

IMPROVEMENT IN THE ARRANGEMENT OF APPARATUS FOR THE MANUFACTURE OF VINEGAR BY THE QUICK PROCESS.

Specification forming part of Letters Patent No. 33,206, dated September 3, 1861.

*To all whom it may concern:*

Be it known that I, FREDERICK MICHAEL, of Des Moines, in the county of Polk and State of Iowa, have invented a new and Improved Method of Producing Vinegar; and I do hereby declare that the following is a full and exact description of the same, reference being had to the accompanying drawing, which forms a part of this specification.

I employ in my method of producing vinegar a vertical tub of, say, eight feet in height and about the proportions represented in the accompanying drawing. About two feet above the true bottom of said tub I place therein a perforated false bottom A and secure the same in any suitable manner. In the tub thus constructed and proportioned I place in regular succession the following ingredients, viz: first, a layer C of corn-cobs of about twelve inches in depth; second, a layer D of charcoal of about twelve inches in depth; third, a layer E of ears of corn of about twelve inches in depth, and then the remaining portion E of said tub I fill with corn-cobs.

The fluid mixture which I convert into vinegar by allowing the same to slowly percolate through the contents of the above-mentioned tub is composed of the following ingredients, viz: To thirty-six gallons of water add four gallons of distillers' high-wines and one quart of molasses and thoroughly incorporate the said ingredients with each other. Before pouring the aforesaid mixture into a vinegar-making tub, which contains a fresh filling of the before-enumerated ingredients, I first slowly pour into the said tub five gallons of distillers' high-wines of about the temperature of 100° Fahrenheit, and then I slowly pour into the said tub about the quantity of one barrel of good vinegar of about the temperature of 100° Fahrenheit. These additions put the contents of one of my improved vinegar-making tubs into the proper condition for the reception of the before-mentioned mixture of water, distillers' high-wines and molasses, and I have ascertained by experiment that by each day supplying the proper quantity of the said liquid mixture and allowing the same to slowly percolate through the original contents of my said vinegar-making tub one barrel per day of the best quality of vinegar can thereby be produced for the space of one entire year. My said vinegar-making tub should be so situated that its contents can be kept at a proper degree of temperature at all seasons of the year.

What I claim as my invention, and desire to secure by Letters Patent, is—

The employment of alternate layers of corn-cobs, charcoal, and ears of corn in the tub which I use in the within-described vinegar-making process, the said layers of corn-cobs, charcoal, and ears of corn being arranged in the manner herein set forth, or in any other that will produce the same effect when a liquor to be acetified is percolated through the said ingredients.

The above specification of my improved method of making vinegar signed by me this 7th day of August, 1861.

FREDERICK MICHAEL.

Witnesses:
W. DE B. FRYER,
RANDOLPH COYLE, Jr.